United States Patent
Lee et al.

(10) Patent No.: US 11,251,892 B2
(45) Date of Patent: Feb. 15, 2022

(54) ASYNCHRONOUS NON-ORTHOGONAL MULTIPLE ACCESS IN A TIME/FREQUENCY DIVISION ORTHOGONAL MULTIPLE ACCESS NETWORK

(71) Applicant: Hughes Network Systems, LLC, Germantown, MD (US)

(72) Inventors: Lin-Nan Lee, Potomac, MD (US); Neal D. Becker, Olney, MD (US); Mustafa Eroz, Germantown, MD (US)

(73) Assignee: Hughes Network Systems, LLC., Germantown, MD (US)

( * ) Notice: Subject to any disclaimer, the term of this patent is extended or adjusted under 35 U.S.C. 154(b) by 195 days.

(21) Appl. No.: 16/530,974

(22) Filed: Aug. 2, 2019

(65) Prior Publication Data
US 2020/0044762 A1 Feb. 6, 2020

Related U.S. Application Data

(60) Provisional application No. 62/713,934, filed on Aug. 2, 2018.

(51) Int. Cl.
*H04J 3/16* (2006.01)
*H04J 3/06* (2006.01)

(52) U.S. Cl.
CPC .......... *H04J 3/1647* (2013.01); *H04J 3/0691* (2013.01)

(58) Field of Classification Search
CPC ............................ H04J 13/1647; H04J 3/0691
See application file for complete search history.

(56) References Cited

U.S. PATENT DOCUMENTS

| 2017/0214655 A1 | 7/2017 | Bhushan et al. |
| 2020/0396698 A1* | 12/2020 | Bala ...................... H04L 5/0005 |

FOREIGN PATENT DOCUMENTS

| WO | 2017197075 A1 | 11/2017 |
| WO | 2018030158 A1 | 2/2018 |
| WO | 2018064582 A1 | 4/2018 |

OTHER PUBLICATIONS

International Search Report and Written Opinion dated Oct. 17, 2019 by the International Searching Authority (European Patent Office) in PCT Application PCT/US2019/045016.

* cited by examiner

*Primary Examiner* — Siming Liu
(74) *Attorney, Agent, or Firm* — NovoTechIP International PLLC

(57) ABSTRACT

Systems and methods are described, and one method includes allocate a continuous duration within a TDMA scheme, for asynchronous NOMA transmissions, and extending from an allocation start time to an allocation termination time, formed of contiguous time slots of the TDMA scheme, and included providing to asynchronous NOMA user terminals an indication of the allocation start time and termination time, indicating allowance to perform asynchronous NOMA transmissions within a start time constraint that starts of the asynchronous NOMA transmissions do not precede the allocation start time, and terminations of the asynchronous NOMA transmissions do not succeed the allocation termination time.

18 Claims, 10 Drawing Sheets
(2 of 10 Drawing Sheet(s) Filed in Color)

ASYNCHRONOUS NON-ORTHOGONAL MULTIPLE ACCESS IN A TIME/FREQUENCY DIVISION ORTHOGONAL MULTIPLE ACCESS NETWORK

CROSS REFERENCE TO RELATED APPLICATION

This application claims the benefit of priority from pending U.S. Provisional Patent Application Ser. No. 62/713,934, filed Aug. 2, 2018, and titled "ASYNCHRONOUS NON-ORTHOGONAL MULTIPLE ACCESS IN A TIME/FREQUENCY DIVISION ORTHOGONAL MULTIPLE ACCESS NETWORK," which is incorporated by reference herein in its entirety.

BACKGROUND

Non-Orthogonal Multiple Access (NOMA) is a general category of wireless bandwidth sharing technique wherein multiple users can concurrently occupy channel bands, with each user's information bits optionally encoded by error correction coding, e.g., forward error correction (FEC). Users' information bits can be sorted at a receiver, by the receiver applying successive interference cancellation (SIC) or other known techniques.

Scrambled Code Multiple Access (SCMA) is a particular instance of a NOMA scheme based on low-rate forward error correction (FEC) codes and scrambling codes with iterative interference cancellation performed at a receiving device such that a large number of transmissions, within a time slot, from different terminals can be correctly separated and decoded. SCMA operates on a rigid time scheduling structure where all transmissions are synchronous (the start of transmissions from different users align in time).

Asynchronous Code Multiple Access (ACMA), also referred to as Asynchronous Scrambled Code Multiple Access (ASCMA) is a modification of SCMA wherein transmissions from different users are asynchronous (the start of transmissions from different users do not align in time). It has been previously demonstrated that ACMA provides greater system capacity than SCMA.

An SCMA/ACMA system may include a communications controller (may be located at a communications hub) which assigns time/frequency resources. When SCMA/ACMA is used as a Random Access (RA) technique the controller may reserve some time/frequency resources for SCMA/ACMA RA use. Random access transmission is also known as Grant Free transmission, where a transmitter needing to send data will transmit autonomously (choosing possibly at random) within the time/frequency resources reserved for this purpose. For example, the controller may reserve a window, e.g., 10 ms, for RA within which a given transmitter might send a burst, e.g., 1 ms, while other transmitters may send 1 ms duration bursts at the same or at other times within that reserved window.

SCMA/ACMA may also be used in a Grant Based mode, where the controller pre-assigns the transmission schedule, assigning in advance time/frequency resources to different transmitters and transmitters may only transmit at their assigned time/frequency. This is in contrast to the Grant Free mode where an overall time/frequency resource is reserved for this purpose, but each transmitter is free to autonomously select to transmit (or not) within this time/frequency resource reservation.

SCMA can be adapted to an Orthogonal Frequency Domain Multiplexing (OFDM) transmission scheme in a straightforward manner. When SCMA is used in a single carrier context successive symbols are transmitted at successive time instances. For OFDM application successive SCMA symbols can be allocated resource elements in a time/frequency grid, as is currently done in terrestrial cellular systems. The start of SCMA transmissions may align with OFDM symbol boundaries.

ACMA can be adapted to OFDM in a similar manner. In that case the ACMA transmissions will not align with the OFDM symbols. If a continuous time was reserved for ACMA there would be no issue, but if it was desired to restrict the reservation to a finite time window there is a need to adapt the transmission scheme, otherwise since ACMA transmissions may begin and end at any time there is no time at which it is guaranteed that all ACMA transmissions have ended.

SUMMARY

This Summary identifies various features and aspects and is not an exclusive or exhaustive description of the disclosed subject matter. Whether features or aspects are included in or omitted from this Summary is not intended as indicative of relative importance of such features. Additional features and aspects are described and will become apparent to persons skilled in the art upon reading the following detailed description and viewing the drawings that form a part thereof.

An example of disclosed systems can include a processor; and a memory, coupled to the processor, that stores executable instructions that, when executed by the processor, can cause the processor to allocate a continuous duration within a TDMA scheme, the continuous duration being for asynchronous NOMA transmissions, and extending from an allocation start time to an allocation termination time, the continuous duration being formed of contiguous time slots of the TDMA scheme; and can cause the processor to provide to a plurality of asynchronous NOMA user terminals an indication of the allocation start time and the allocation termination time, indicating allowance to the asynchronous NOMA user terminals to perform asynchronous NOMA transmissions within a start time constraint and a termination time constraint, the start time constraint being that respective starts of the asynchronous NOMA transmissions do not precede the allocation start time, and the termination time constraint being that respective terminations of the asynchronous NOMA transmissions do not succeed the allocation termination time.

An example of disclosed methods can include allocating a continuous duration within a TDMA scheme, the continuous duration being for asynchronous NOMA transmissions, and the continuous duration extending from an allocation start time to an allocation termination time, the continuous duration being formed of contiguous time slots of the TDMA scheme; and can include providing to a plurality of asynchronous NOMA user terminals an indication of the allocation start time and the allocation termination time; and providing to the asynchronous NOMA user terminals an allowance to perform asynchronous NOMA transmissions that are within a start time constraint and a termination time constraint, the start time constraint being that respective starts of the asynchronous NOMA transmissions do not precede the allocation start time, and the termination time constraint being that respective terminations of the asynchronous NOMA transmissions do not succeed the allocation termination time.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The drawing figures depict one or more implementations in accord with the present teachings, by way of example only, not by way of limitation. In the figures, like reference numerals refer to the same or similar elements.

FIG. 10A shows synchronous transmission in one subframe; FIG. 10B shows asynchronous transmission; and FIG. 10C shows simulated results methods according to the present disclosure.

DETAILED DESCRIPTION

In the following detailed description, certain details are set forth by way of examples in order to provide a thorough understanding of the relevant teachings. However, it should be apparent that the present teachings may be practiced without such details. In other instances, well known procedures, components, and/or circuitry have been described at a relatively high-level, without detail, to avoid unnecessarily obscuring aspects of the present disclosure.

Figure 1:
FIG. 1 is a diagram of one example subframe assignment in an implementation of synchronous time slot multiplexed access to a time-frequency transmission resource.

FIG. 1 shows a TDMA allocation plan 100 for access to a frequency resource 102. The allocation plan 100, at a first or higher level, allocates access time according to frames. Each frame can have FR bits (not explicitly visible in FIG. 1). At a second or lower level, each frame can be segmented into K subframes, as represented by the examples SF1, SF2, . . . , SFK (generically referenced as "subframe(s) SF"). When a user terminal requests access to frequency resource 102, a network controller (not explicitly visible in FIG. 1) assigns one or more of the subframes SF to that terminal for its transmissions. Multiple user terminals can therefore share a frequency resource, which in the FIG. 1 example is the frequency resource 102, by transmitting in different subframes SF. Since the subframes SF do not overlap, the terminals' respective signals are orthogonal to one another.

For purposes of description it can be assumed that each ACMA user terminal is assigned one of the subframes SF. This assumption is only for avoiding details not particular to disclosed aspects; it is not a limitation. Integration of ACMA in a TDMA framework as illustrated by the allocation plan 100 can be provided, but particular conditions must be met. One is that all the ACMA user terminals must send the same size messages. Another is all the ACMA user terminals must be synchronized to the TDMA subframe boundaries. If these conditions are met each user ACMA terminal can be assigned one or more of the subframes SF. Multiple ACMA user terminals can be assigned to any one or more of the subframes SF, as ACMA inherently provides for multiple overlapping, or partially overlapping transmissions.

Figure 2:
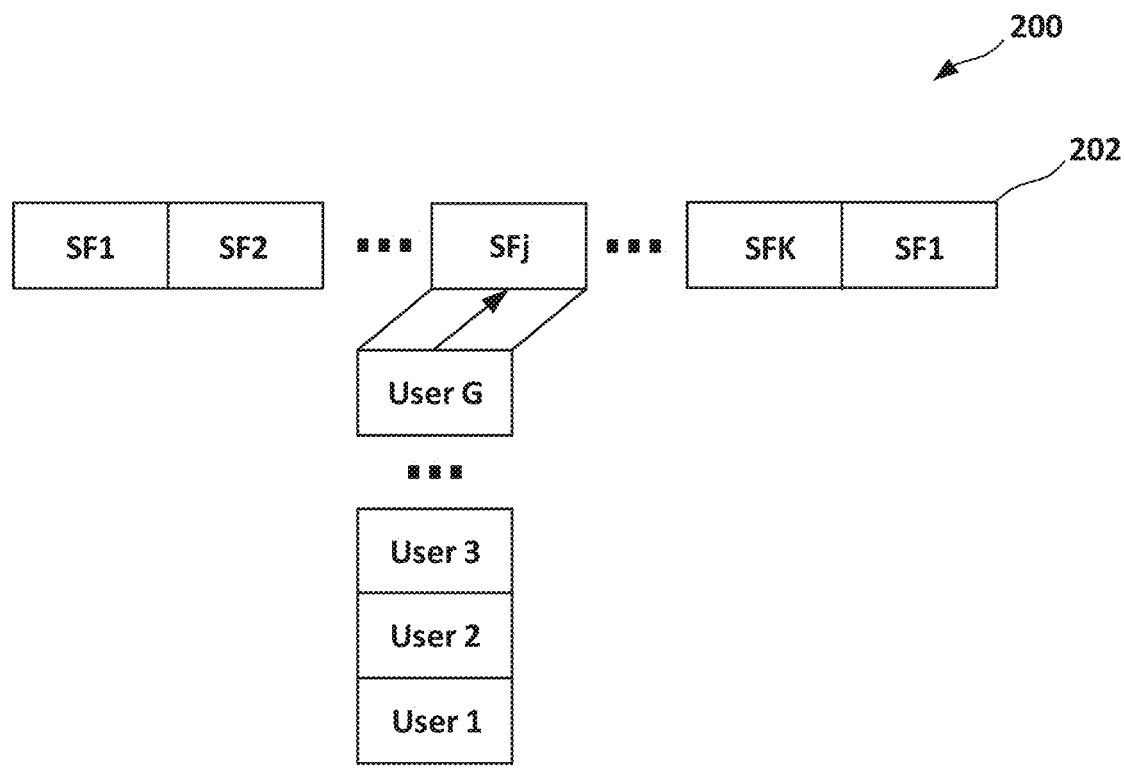
FIG. 2 is a diagram of one implementation for a synchronous constrained assignment of NOMA users to subframes in the FIG. 1 implementation of synchronous time slot multiplexed access to a time-frequency transmission resource.

FIG. 2 shows an example 200 of such assignment, with a total of G ACMA user terminals being assigned to subframe SFj. Subframes other than subframe SFj can be independently assigned to other user terminals. Such assignments can be to single user terminals operating in orthogonal access, meaning a unique time slot of access to the entire resource 102, or can be to another group of ACMA user terminals, e.g., a group other than the G NOMA user terminals assigned to subframe SFj.

The FIG. 2 ACMA transmissions are shown to be constrained to being synchronous with the subframe SFj boundary, meaning that transmission by each of the G NOMA user terminals must start and must end within the subframe SFj boundary. This configuration can be termed "synchronized ACMA transmission," the synchronization being strict confinement to the TDMA subframe SFj boundary.

For purposes of this description, the term TDMA encompasses time division multiple access to a single frequency, e.g., a single carrier frequency and encompasses time division multiple access to sub-carrier of a multiple carrier resource frequency, such as performed by OFDM techniques. In other words, as used in this description, the term OFDM is a type or species of TDMA, with TDMA access to each of the OFDM sub-carriers. Accordingly, it will be understood that descriptions in reference to drawings in which transmissions are graphically represented relative to a horizontal axis time, and overlapping in time is represented as a stacking, and partial overlapping as offset stacking, spaced apart vertically, that transmissions—including overlapping or partially overlapping transmissions—can be at the carrier frequency of a single carrier TDMA system or can be at one of multiple carriers of, for example, an OFDM system.

The present inventors have identified technical shortcomings of the above-described synchronized ACMA transmission. One shortcoming is that the potential multiple access capacity is cut in half. Another shortcoming of synchronized ACMA transmission is that it requires asynchronous NOMA user terminals to maintain precise transmission timing, relative to the TDMA subframe timing. This timing requirement can impose costs such as, but not limited to, higher standby power consumption by the terminal.

Systems and methods in accordance with the present disclosure include various features that can provide benefits including, but not limited to, technical solutions to the above-identified shortcomings. In one or more implementations, a system controller can allocate a continuous duration, within a TDMA scheme, for asynchronous NOMA transmissions. The allocated continuous duration can extend from an allocation start time to an allocation termination time, and the continuous duration can be formed of contiguous time slots of the TDMA scheme. In an implementation, the controller or other system resources can provide to a plurality of asynchronous NOMA user terminals an indication of the allocation start time and the allocation termination time. In one aspect, the system can be configured wherein the indication of the allocation start time and the allocation termination time can be or can be associated with is a "Grant Free" operative allowance to the asynchronous NOMA user terminals to perform, or not perform, asynchronous NOMA transmissions at any time within a start time constraint, provides each terminates with a termination time constraint. The start time constraint can be that respective starts of the asynchronous NOMA transmissions do not precede the allocation start time. The termination time constraint can be that respective terminations of the asynchronous NOMA transmissions do not succeed the allocation termination time.

Technical features and benefits of the above-described configuration include, but are not limited to, enabling ACMA to share a fraction of a frequency resource with communications using synchronous TDMA, while achieving most of the multiple access capacity obtained by ACMA. Additional technical features include, but are not limited to, enabling ACMA to operate in Time Division Duplex (TDD) mode. Technical features and benefits can include, without limitation, a doubling of potential multiple access capacity of a NOMA system (e.g., SCMA). Technical features and benefits can also include, but are not limited to, the enabling of user terminal designs with additional flexibility in time synchronization requirements.

Figure 3:
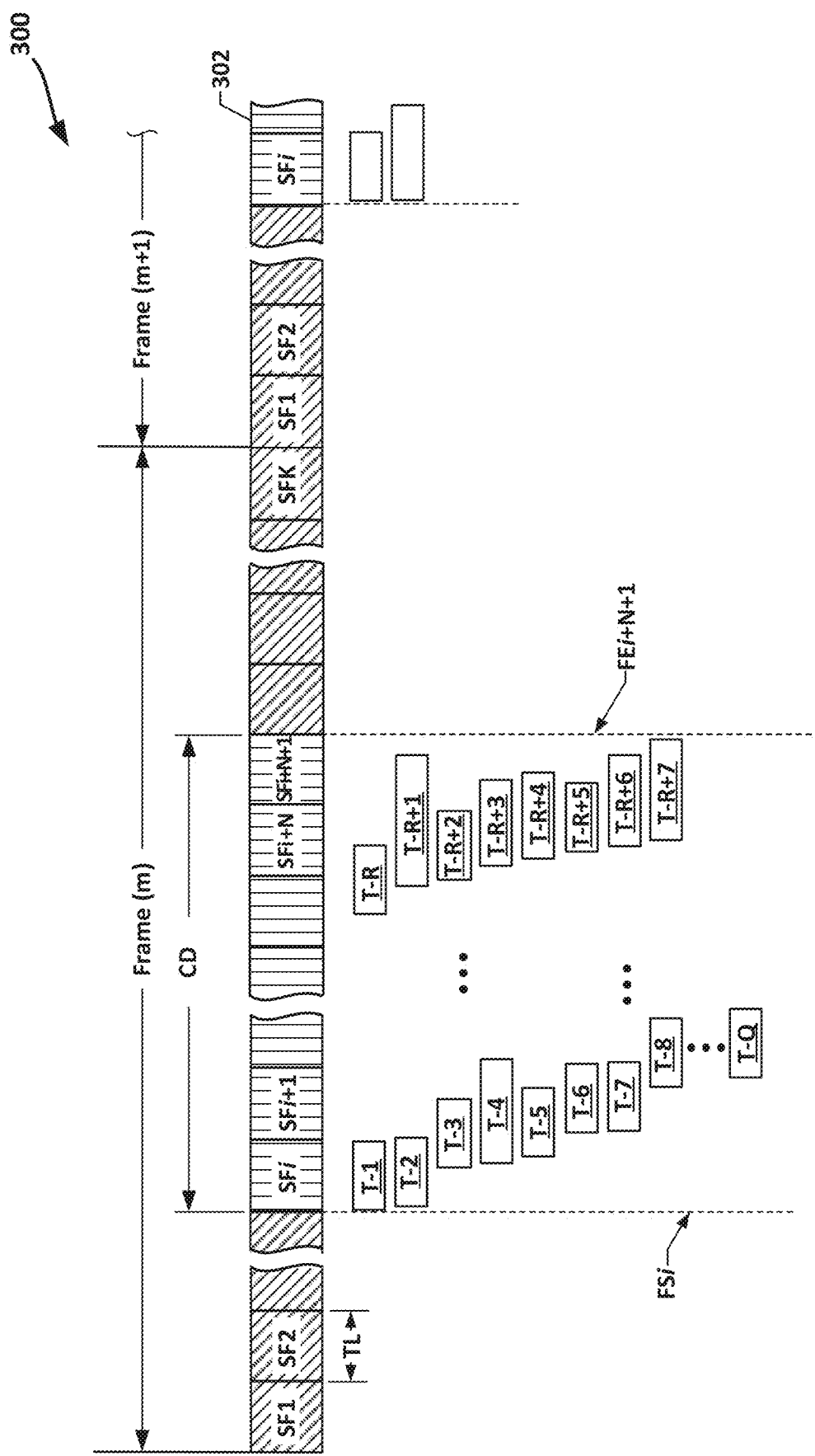
FIG. 3 illustrates one example Grant Free allocation, in a process of asynchronous NOMA access to a synchronous TDMA time-frequency transmission resource, according to one or more aspects of this disclosure.

FIG. 3 shows diagram of an allocation scheme 300, for a sequential frame synchronous TDMA time-frequency transmission resource 302 (hereinafter "synchronous TDMA resource 302"), and a particular allocation to asynchronous NOMA transmissions. The synchronous TDMA resource 302 can include, for example, a modulated carrier carrying sequential frames of data, such as the example sequence that includes Frame(m) and its succeeding Frame (m+1) (generically "transmission frames"). Each of the transmission frames can include K subframes, which can be according to the FIGS. 1 and 2 subframes SF, and examples visible in FIG. 3 include SF1, SF2, . . . , SFK, (generically "SF"), "K" being an integer. Each of the K subframes SF can serve as a synchronous TDMA resource 302 time slot.

In accordance with the allocation scheme 300, a continuous duration CD of the TDMA resource 302 can be allocated for Grant Free asynchronous NOMA transmissions. In an implementation, the allocated continuous duration CD can extend from an allocation start time, such as the start FSi of $SFi^{th}$ sub-frame SFi, to an allocation termination time, such as the end FE(i+N+1) of the $(i+N+1)^{th}$ subframe SF(i+N+1). The continuous duration CD can be formed of contiguous time slots SFi through SF(i+N+1) of the TDMA scheme. The indication of the allocation start time and the allocation termination time can be or can be associated with the Grant Free operative allowance to the asynchronous NOMA user terminals to perform, or not perform, asynchronous NOMA transmissions within a start time constraint and a termination time constraint. The start time constraint can be that respective starts of the asynchronous NOMA transmissions do not precede the allocation start time, e.g., the start FSi of $SFi^{th}$. The termination time constraint can be that respective terminations of the asynchronous NOMA transmissions do not succeed the allocation termination time, e.g., the end FE(i+N+1) of the $(i+N+1)^{th}$ subframe SF(i+N+1).

FIG. 3 examples of asynchronous NOMA transmissions in accordance with the scheme 300 include a succession T-1, T-2, T-3, . . . , T-Q, . . . , T-R, T-R+1, T-R+2, . . . , T-R+7. Q can be any integer. The number of asynchronous NOMA transmissions (not visible) between T-Q and T-R can be arithmetic zero or any positive integer.

In an implementation, controller allowance to the asynchronous NOMA user terminals can include allowance to perform a plurality of asynchronous NOMA transmissions, in a manner such that at least two of the asynchronous NOMA transmissions at least partially overlap in time. Referring to FIG. 3, examples include asynchronous NOMA transmissions T-1, T-2, . . . , T-5, as all have at least partial overlap in time. Also, in an implementation, indicating allowance to the asynchronous NOMA user terminals can include allowance to perform asynchronous NOMA transmissions having randomized start times, the randomized start times being within the start time constraint. Referring to FIG. 3, the start times (visible but not separately labeled) of asynchronous NOMA transmissions T-1, T-2, T-3, . . . , T-Q can be localized randomized start times, . . . , and the start times (visible but not separately labeled) of asynchronous NOMA transmissions T-R, T-R+1, T-R+2, . . . , T-R+7 can be localized randomized start times. In this context, "localized" can be local to the respective asynchronous NOMA user terminals.

In an implementation, the contiguous time slots of the TDMA scheme can have respective time slot durations, and the allowance to the asynchronous NOMA user terminals to perform the plurality of asynchronous NOMA transmissions can include allowance for at least one of the asynchronous NOMA transmissions to extend for a duration that exceeds at least one of the respective time slot durations—provided the termination does not succeed the termination time constraint. Referring to FIG. 3, SF2 can be an example time slot of the visible TDMA scheme, and example asynchronous NOMA transmissions T-4 and T-R+1 are among the visible examples having a transmission duration that exceeds at least one, e.g., SF2, of the respective time slot durations.

It is observed that the multiple access capacity of this scheme as compared to the fully asynchronous scheme is reduced by a factor of N/(N+1) because on the average, only N subframes worth of traffic is carried by N+1 subframes. But the asynchronous NOMA has twice the capacity as ACMA, in most cases.

The following TABLE 1 summarizes the capacity improvement over synchronous NOMA that can be obtained via disclosed asynchronous NOMA systems and methods, as a function of the number of contiguous subframes assigned.

TABLE 1

| | Number Subframes | | | | | |
|---|---|---|---|---|---|---|
| | 1 | 2 | 3 | 4 | 5 | 7 | 10 |
| Capacity Over Synchronous NOMA | N/A | 1 | 1.33 | 1.5 | 1.6 | 1.71 | 1.8 |

In one alternative implementation, a system such as described in reference to FIG. 3 can be constructed and processes performed thereon in a "Grant Based" configuration. In one Grant Based configuration, transmission configurations to asynchronous NOMA user terminals can include identification of a particular time slot among the first N of the N+1 contiguous time slots, and can include configuration for least two asynchronous NOMA user terminals among the plurality of asynchronous NOMA user terminals to perform respective asynchronous NOMA transmissions that have respective asynchronous NOMA transmission start times within the particular time slot and, for a duration during the particular time slot, are in mutual overlap. For example, referring to FIG. 3, an implementation can include allocating the time slot of subframe SFi to the asynchronous NOMA user terminal (not visible in FIG. 3) associated with asynchronous NOMA transmission T-1, and the same time slot to the respective asynchronous NOMA user terminals associated with asynchronous NOMA transmission T-2, or T-3, or T-4, or T-5, or any two or more among T-2, T-3, T-4, and T-5.

In addition, in a grant based system such as described above, the configurations provided to the plurality of asynchronous NOMA user terminals, can allow those asynchronous NOMA user terminals to independently set, within the particular time slot (e.g., SFi), the respective asynchronous NOMA transmission start times. For example, the asynchronous NOMA user terminals can be allowed to set their respective transmission start times using respective local random number generation algorithms. The local random number generation algorithms can be, for example, according to conventional random number generation techniques. Such random number generation techniques are readily available from various textbooks and treatises and, therefore, further detailed description is omitted. In another example, the asynchronous NOMA user terminals can be allowed to set their respective transmission start times using any among a variety of deterministic algorithms. Persons of ordinary skill in the art, having possession of this disclosure and facing a particular application, can readily select from such deterministic algorithms, to obtain a staggering and various overlapping of multiple asynchronous NOMA transmissions, all starting within the same time slot, in accordance with this disclosure. Therefore, further detailed description is omitted.

In one or more implementations of a Grant Based configuration in accordance with this disclosure, the particular time slot can be a first time slot, and the transmission configurations to the plurality of asynchronous NOMA user terminals can include a configuration for another NOMA user terminal among the plurality of asynchronous NOMA user terminals to perform another asynchronous NOMA transmission, having another asynchronous NOMA transmission start time. For example, referring to FIG. 3, the at least two asynchronous NOMA user terminals can the respective terminals associated with T-3 and T-4. In an aspect the transmission configurations to the plurality of asynchronous NOMA user terminals can include another asynchronous NOMA transmission start time being within a second time slot among the first N time slots, and the second time slot can be contiguous to the first time slot. One or more configurations can include at least one among the asynchronous NOMA transmissions that during the particular time slot are in mutual overlap can be, for a duration during the second time slot, in mutual overlap with the another asynchronous NOMA transmission. Referring to FIG. 3, an example "another asynchronous NOMA transmission" can be T-7. As visible, both T-3 and T-4 have, for duration within the second time slot SFi+1, mutual overlap with T-7.

In one or implementations of a Grant Based configuration, at least one among the asynchronous NOMA transmissions that during the particular time slot are in mutual overlap, can extend into another time slot among the first N time slots, and the another time slot can be contiguous to the particular time slot. Referring to FIG. 3, both T-3 and T-4 are an example of this implementation, as both extend into subframe SFi+1, which can be the "second time slot.

In another implementation of a Grant Based system or method in accordance with tis disclosure, ACMA user terminals to whom the N+1 contiguous subframes are allocated can be grouped into a plurality of groups. Each of the groups can be allocated, for example, one subframe among the first N subframes of the allocated N+1 contiguous subframes.

Figure 4:
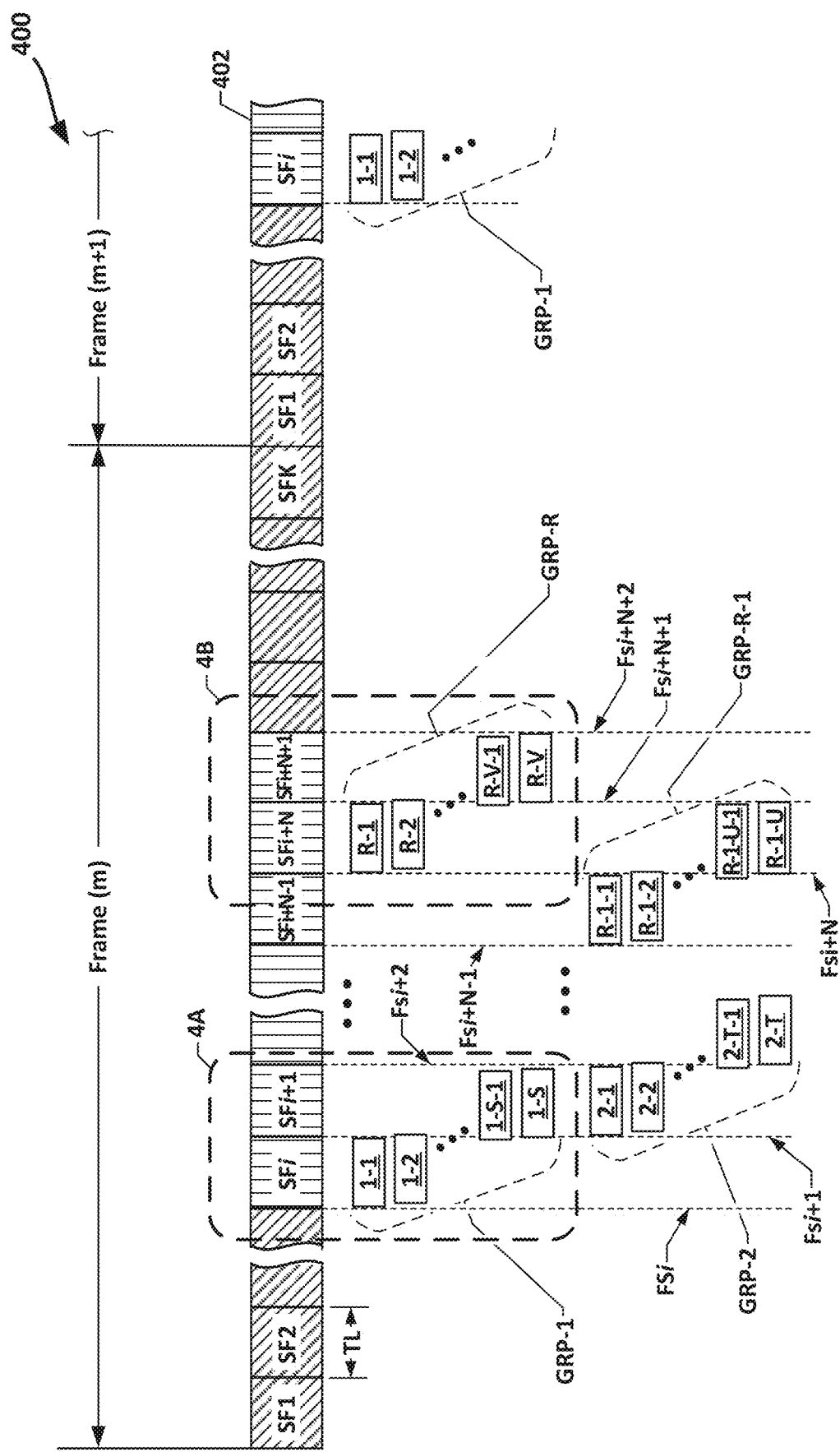
FIG. 4 illustrates one example Grant Based allocation, in a process of asynchronous NOMA access to time slots of a synchronous TDMA time-frequency transmission resource, according to one or more aspects of this disclosure.

FIG. 4 shows an example Grant Based implementation, having a grouping configuration that includes R of such groups, and shows representative examples of the R groups, which include a first group GRP-1, second group GRP-2, . . . , R-1 group GRP-R-1, and $R^{th}$ group GRP-R (hereinafter collectively referenced as "groups GRP" and generically as "group GRP"). The FIG. 4 example allocates subframe SFi to the first group GRP-1, subframe SF(i+1) to the second group GRP-2, and this can continue through to allocation of subframe SF(i+N-1) to the $(R-1)^{th}$ group GRP-R-1, and allocation of subframe SF(i+N) to the $R^{th}$ group GRP-R. In the FIG. 4 allocation scheme each of the R groups GRP is allocated one of the first N of the N+1 continuous subframes, and it will be assumed that all N of the first N subframes are allocated. Therefore, in the example allocation scheme 400, R is equal to N.

The FIG. 4 example grouping assumes first group GRP-1 includes a population of S asynchronous NOMA user terminals, "S" being an integer; second group GRP-2 includes T asynchronous NOMA user terminals; $(R-1)^{th}$ group GRP-R-1 and $R^{th}$ group GRP-R include U asynchronous NOMA user terminals and V ACMA user terminals, respectively. The remaining groups GRP (not explicitly visible in FIG. 4) can likewise include respective numbers of asynchronous NOMA user terminals. The populations S, T, U, and V, and populations of remaining groups GRP can be mutually identical or can differ from one another.

For each of the groups GRP, being allocated one of the first N of the N+1 continuous subframes means the group's asynchronous NOMA user terminals can transmit an ACMA transmission which has a transmission start time within that allocated subframe. For example, there can be S ACMA transmissions by first group GRP-1, one by each of the group's S asynchronous NOMA user terminals, each of the transmissions having a transmission start time within subframe SFi. Visible examples in FIG. 4 are labeled 1-1, 1-2, . . . , 1-S-1, 1-S. Likewise, there can be T ACMA transmissions by second group GRP-2, labeled 2-1, 2-2, . . . , 2-T-1, 2-T, one by each of the group's T asynchronous NOMA user terminals, with each transmission having a transmission start time within subframe SFi+1. This ACMA transmission pattern can continue, on through to U ACMA transmissions by $(R-1)^{th}$ group GRP-R-1 and ending with V ACMA transmissions by $R^{th}$ group GRP-R. Each of the U ACMA transmissions by $(R-1)^{th}$ group GRP-R-1 can have a transmission start time within subframe SFi+N-1, and each of the V ACMA transmissions by $R^{th}$ group GRP-R can have a transmission start time within subframe SFi+N.

Figure 5A:
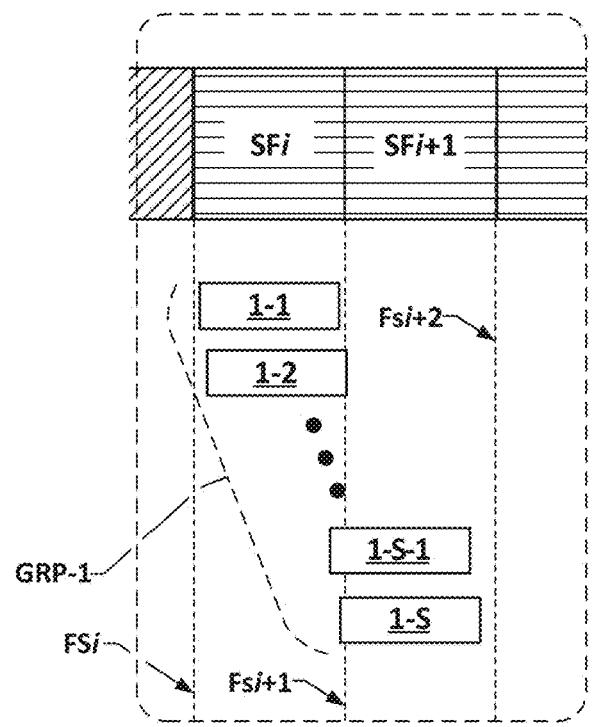
FIG. 5A is an enlarged view of FIG. 4 area 5A.

Each of the subframes SF can occupy a time slot of width TL seconds, extending from slot start time to slot end time, which can also be referenced as "next slot start time." For example, FIG. 4 subframe SFi, which for the allocation scheme 400 has been allocated to first group GRP-1, starts at slot start time FSi and ends at the next slot start time FSi+1. In an implementation, transmission start times for asynchronous NOMA user terminals within the first group GRP-1, can be randomly assigned to times between FSi and FSi+1. Referring to FIG. 5A, which is an enlarged view of FIG. 4 area 5A, the start times can be, but are not necessarily, equally spaced. As visible in FIG. 5A, the combination of transmission start time and duration of the ACMA transmissions can be such that ACMA transmission 1-1 starts and ends within the subframe SFi time slot, while transmission 1-S starts within the subframe SFi time slot and ends within the next subframe SFi+1 time slot. As partially visible in FIG. 5A, for a duration during subframe SFi time slot all of the first group GRP-1 transmissions overlap. Similarly, as visible in FIG. 4, the combination of transmission start time and duration of the ACMA transmissions can be such that second group GRP-2 ACMA transmission 2-1 starts and ends within the subframe SFi+1 time slot, while transmission 2-T starts within the subframe SFi+1 time slot and ends within the next subframe SFi+2 time slot. Also, as partially shown in FIG. 4, for a duration during subframe SFi+1 time slot all of the second group GRP-2 transmissions overlap.

Figure 5B:
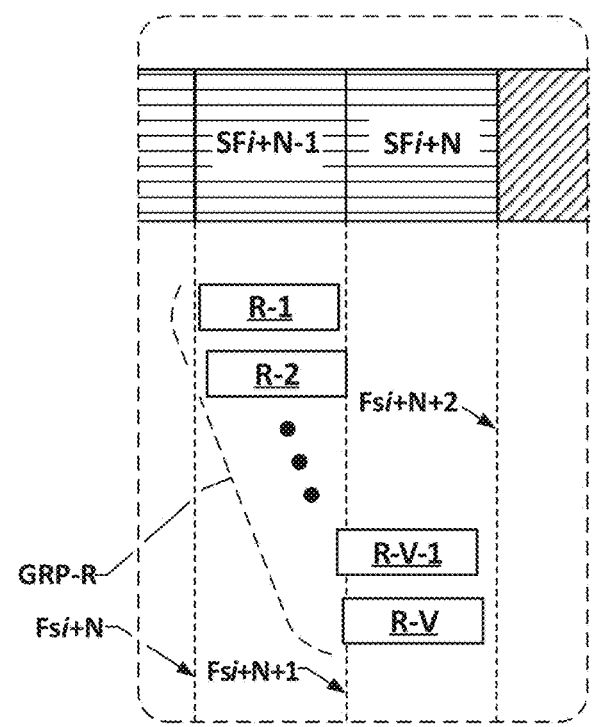
FIG. 5B is an enlarged view of FIG. 4 area 5B.

As visible in FIG. 5B, which is an enlarged view of FIG. 4 area 5B, subframe SFi+N−1, which for the allocation scheme 400 has been allocated to the $R^{th}$ group GRP-R, starts at slot start time FSi+N and ends at the next slot start time FSi+N+1. Start times and durations of the ACMA transmissions by the $R^{th}$ group GRP-R can be such that the group's ACMA transmission R-1 starts and ends within the subframe SFi+N time slot, while transmission R-V starts within the subframe SFi+N time slot and ends within the next subframe SFi+N+1 time slot. It will be understood, though, that in accordance with the aspect of the transmission duration not exceeding the subframe time slot width, neither transmission R-V nor any other transmission by $R^{th}$ group GRP-R extends past FSi+N+1, the start time of the subframe immediately succeeding SFi+N+1, i.e., a subframe not allocated for asynchronous NOMA transmission.

Figure 6:
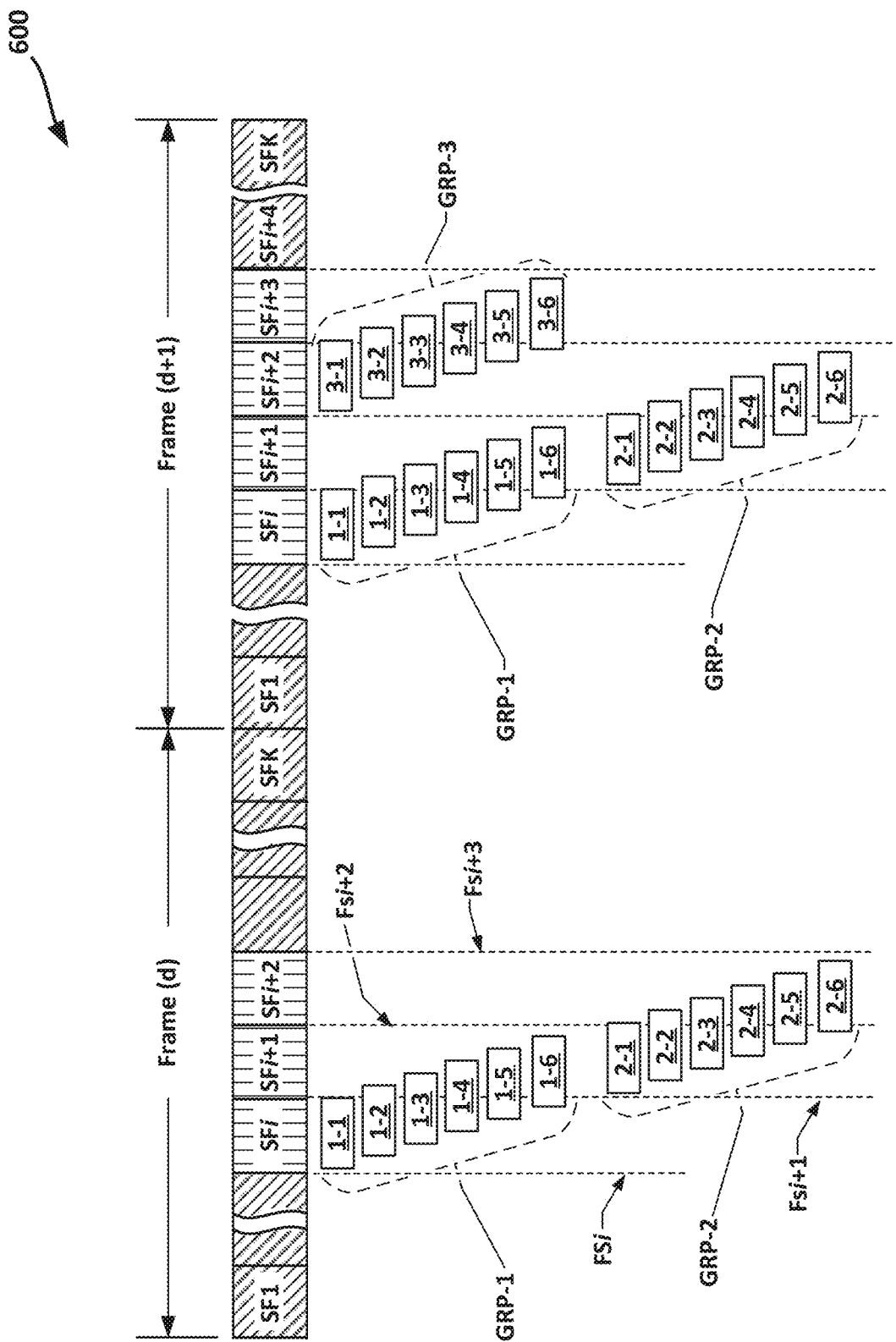
FIG. 6 is a diagram of one allocation scheme in which allocation of TDMA subframes to asynchronous NOMA user terminals changes from frame-to-frame.

FIG. 6 shows an implementation of an allocation scheme 600 in which allocation of TDMA subframes to asynchronous NOMA user terminals for respective ACMA transmissions within a TDMA scheme changes from frame-to-frame. FIG. 6 shows example N of integer 2 for a Frame (d). For Frame (d) a first group GRP-1, having integer 6 asynchronous NOMA user terminals, has been allocated subframe SFi and second group GRP-2, also having integer 6 asynchronous NOMA user terminal, has been allocated subframe SFi+1. Respective ACMA transmissions by first group GRP-1, 1-1, 1-2, . . . , 1-6, each have start times within subframe SFi, at least one terminates within subframe SFi and at least one extends into the next subframe SFi+1. Respective ACMA transmissions by second group GRP-2, 2-1, 2-2, . . . , 2-6, each have start times within subframe SFi+1, at least one terminates within subframe SFi+1 and at least one extends into the next, and last of the allocated subframes, which is SFi+2. None extend beyond SFi+2.

FIG. 6 shows the allocation changing N from integer 2 to integer 3 for a succeeding Frame (d+1). The change includes another subframe, SFi+3 to the asynchronous NOMA allocation, and which allows SFi+2 to be allocated to another group, GRP-3, has been added. Each of the first and second groups GRP-1 and GRP-2 maintains its respective 6 ACMA user terminals. Referring to Table 1, the increase of N from integer 2 to integer 3, provides increased capacity over synchronous NOMA from 1.33 to 1.5.

Figure 7:
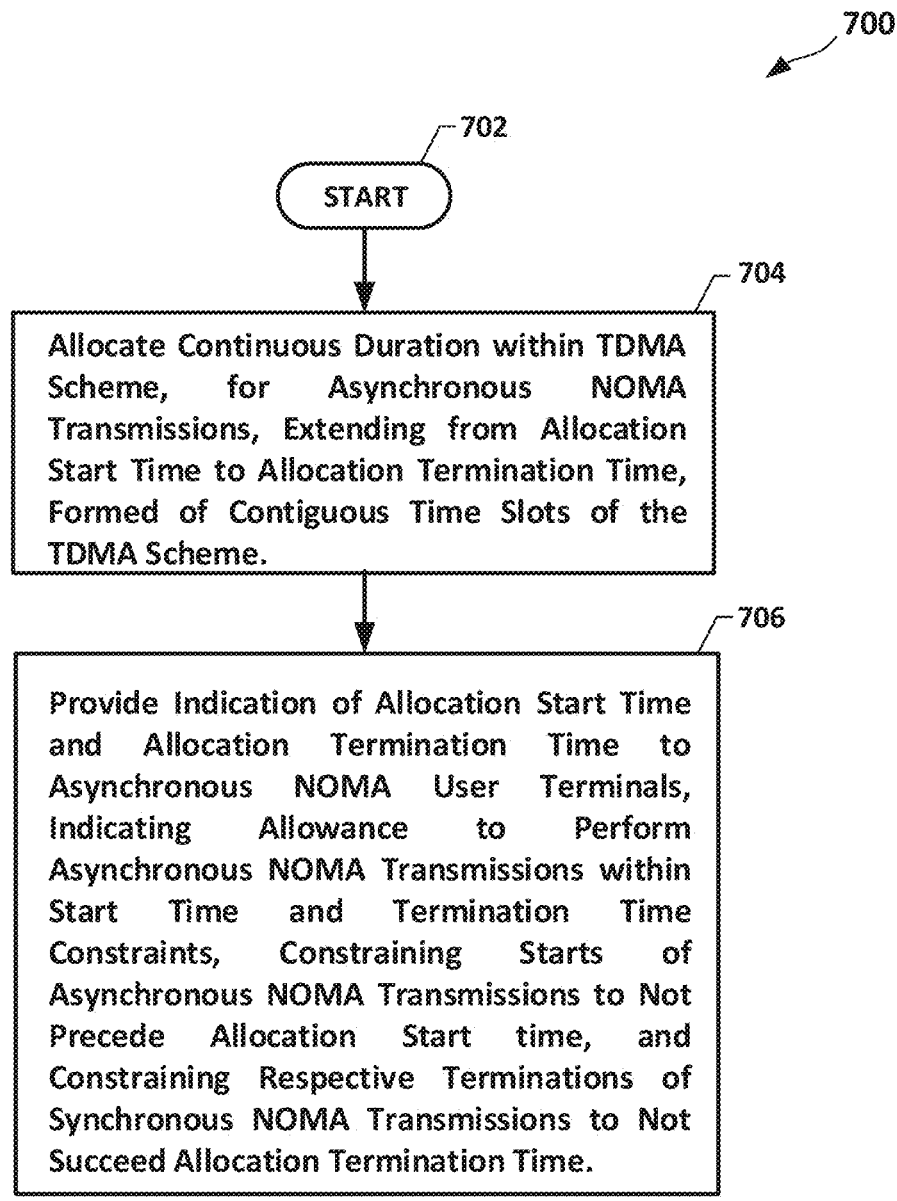
FIG. 7 is a logical flow diagram representing example operations within one example process of asynchronous NOMA access to a synchronous time slot multiplexed access time-frequency transmission resource, according to one or more aspects of this disclosure.

FIG. 7 is a logic diagram of a flow 700 of example operations in one process of asynchronous NOMA access to time slots of a synchronous time slot multiplexed access time-frequency transmission resource, according to one or more aspects of this disclosure. Description in subsequent paragraphs introduces FIG. 7 functional blocks sequentially. As will be understood by persons of ordinary skill upon reading this disclosure in its entirety, performance or execution of operations in practices according to this disclosure can correspond to the logic of the flow 700, without having a strictly one-to-one correspondence to the FIG. 7 distribution of functions to blocks.

An instance of a process according to the flow 700 assumes an extant communication system providing a TDMA resource having separately allocable time slots. The time slots can be subframes, such as the subframes SF described in reference to FIGS. 3, 4, 5A-5B, and 6.

A process according to the 700 can proceed from an arbitrary start 702 to 704, where operations can allocate a continuous duration within a TDMA scheme, for asynchronous NOMA transmissions. One example can be the continuous duration CD described in reference to FIG. 3. Another example can be the N+1 contiguous subframes described in reference to FIGS. 4, 5A, 5B, and 6. The continuous duration can extend from an allocation start time to an allocation termination time, the continuous duration being formed of contiguous time slots of the TDMA scheme. In example instances, the flow 700 can proceed from 704 to 706, where operations can be applied to provide to a plurality of asynchronous NOMA user terminals an indication of the allocation start time and the allocation termination time. In an implementation, the indication can enable or operate as allowance to the asynchronous NOMA user terminals to perform asynchronous NOMA transmissions. The allowance can be, for example, a Grant Free allowance such as described above in reference to FIG. 3. In one or more examples, the allowance can be a Grant Based allowance, such as described above in reference to FIGS. 4, 5A, 5B, and 6.

Figure 8:
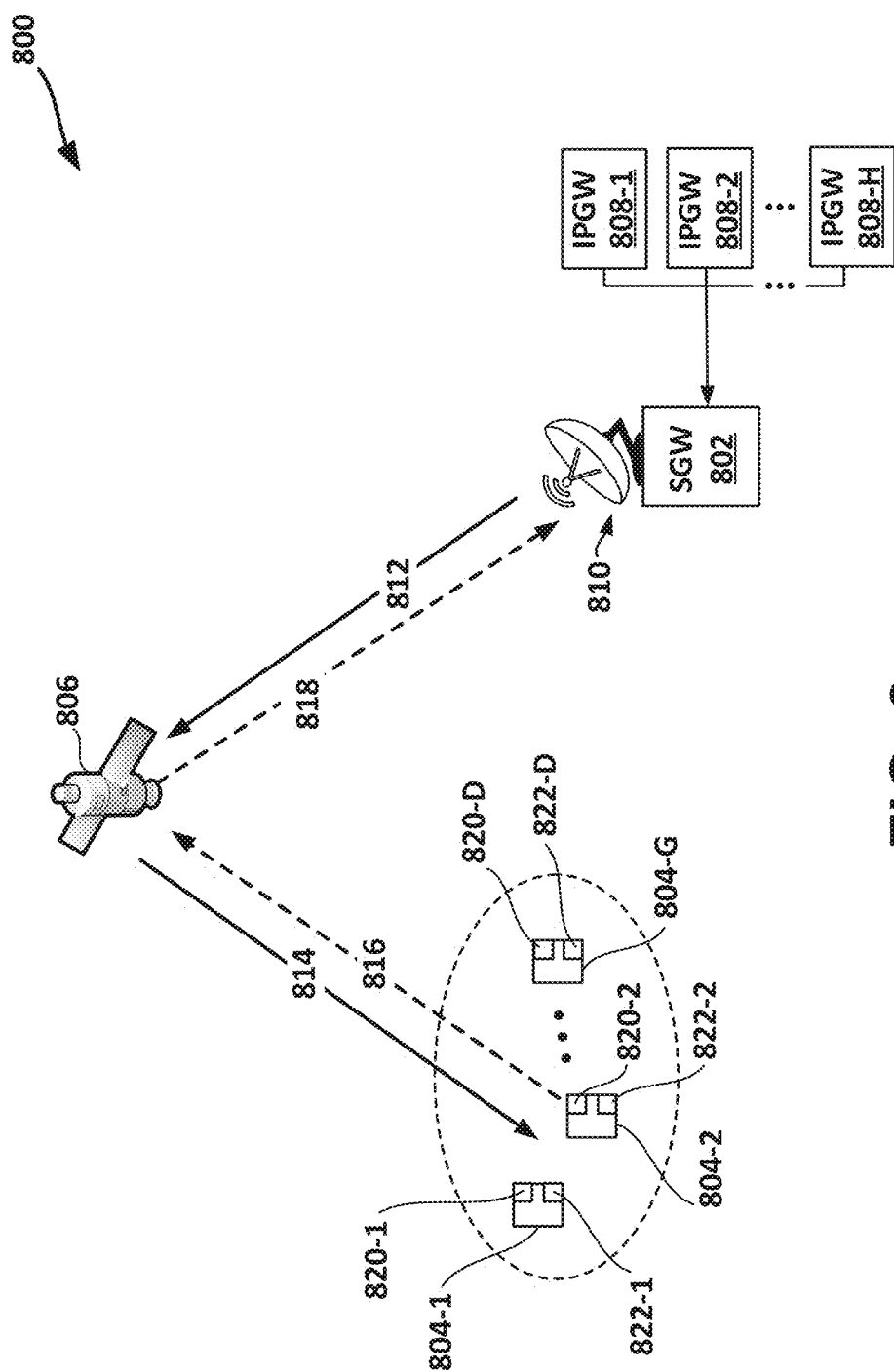
FIG. 8 is a functional block diagram of an example satellite-based communication system upon which aspects of this disclosure may be implemented.
Figure 9:
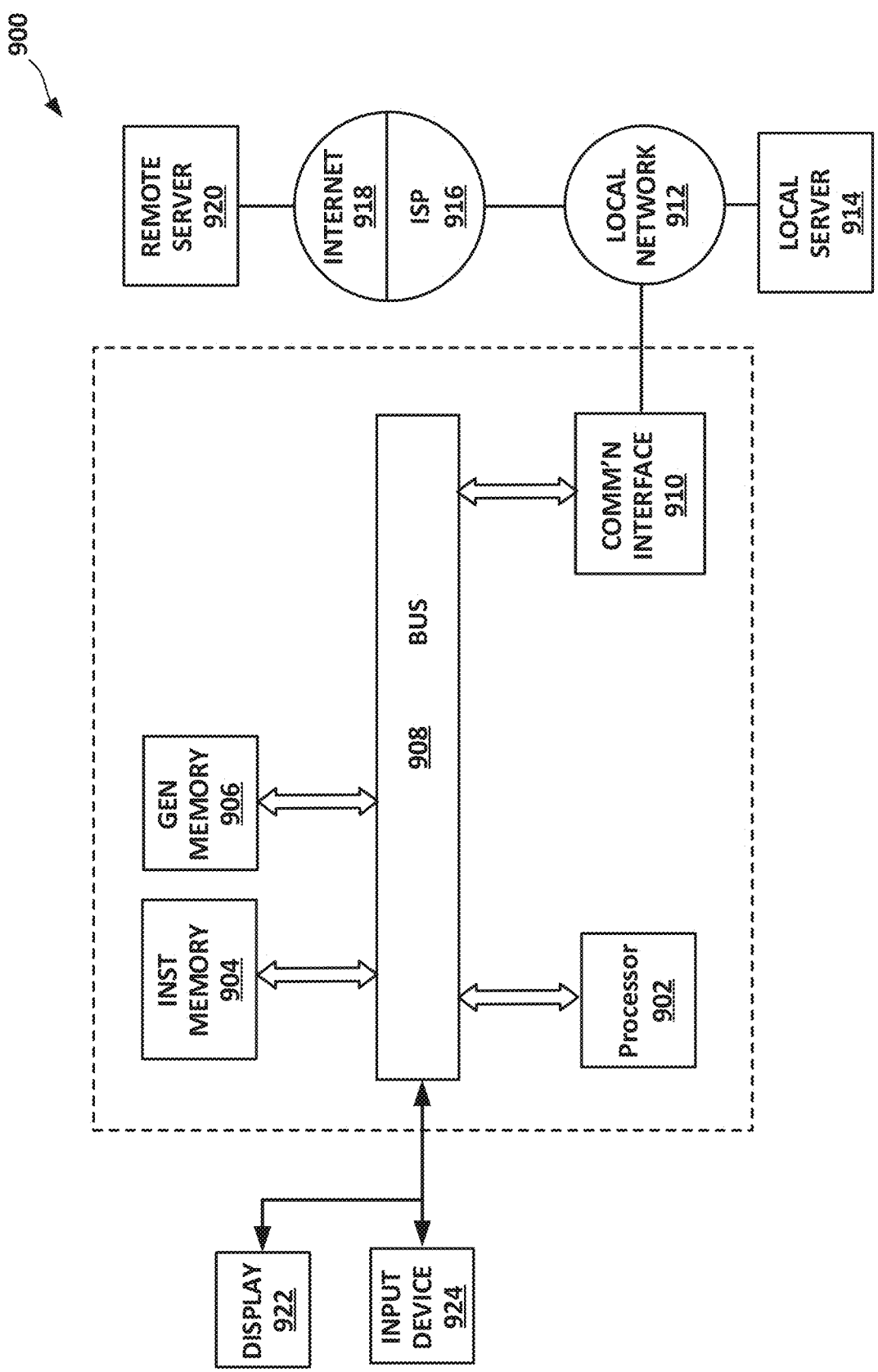
FIG. 9 is a functional block diagram of an example computer system upon which aspects of this disclosure may be implemented.

FIG. 8 illustrates an example satellite network system 800 (hereinafter "system 800") in which various aspects of the present disclosure may be implemented. The system 800 can be configured of a bent pipe, very small aperture terminal (VSAT) satellite network, and can include a satellite gateway (SGW) 802, an arbitrary number H of remote VSAT terminals 804-1, 804-2, . . . 804-G (collectively "VSATs 804"), a satellite 806, and a number H of Internet protocol gateways (IPGWs) 8084, 808-2, . . . 808-H (collectively "IPGWs 808"), and a radio frequency (RF) terminal 810, SGW 802 may be connected to remote terminals, such as the example VSATs 804, via forward uplink 812 for carrying data from SGW 802 to the satellite 806, and forward downlink 814 for carrying data from the satellite 806 to the VSATs 804. VSATs 804 can be configured to transmit, via return uplink 816, data to the satellite 806, for transmission, via return downlink 818, to SGW 802. SGW 802 may be part of satellite earth stations with connectivity to ground telecommunications infrastructure. RF terminal 810 may be the physical equipment responsible for sending and receiving signals to and from satellite 806 and may provide air interfaces for the SGW 802.

Satellite 806 may be any suitable communications satellite. Signals communicated through satellite 806 in the forward direction may, for example, be according to the DVB-S2x standard. Signals communicated through satellite

806 in the return direction may be based, for example, on the IPoS standard. Other suitable signal types may also be used in either direction.

The bandwidth of RF terminal 810 can be shared among IPGWs 808. At each of the IPGWs 808 traffic flows may be processed and multiplexed before being forwarded to priority queues (not visible in FIG. 8). Data from, for example the Internet, and intended for remote terminals 804 may be in the form of IP packets, including TCP packets and UDP packets, or any other suitable IP packets. The IP packets may enter SGW 802 from any one of IPGWs 808. The received IP packets may be processed and multiplexed by SGW 802 along with IP packets from other ones of the IPGWs 808. The IP packets may then be transmitted to satellite 806, e.g., over forward uplink 812, and from satellite 806 to the VSATs 804, e.g., as IP packets over forward downlink 814. In an implementation, IP packets (or data configured according to various other protocols) may enter the network via the VSATs 804, be processed by the VSATs, and transmitted to satellite 806 over return uplink 816, and then transmitted from the satellite 806 to SGW 802 over the return down link 818.

In an implementation, each VSAT 804 can include one or more transmission devices, as represented by items 820-1, 820-2, . . . 820-D (collectively "transmission device(s) 820") of which groups (not explicitly labeled in FIG. 8) can be configured to perform asynchronous NOMA transmissions, within the interval AYS, such as described above in reference to FIG. 3. Alternatively, the transmission devices 820 can be configured in accordance with the above-described Grant Based implementation, particular assigned time slots of a synchronous orthogonal time/frequency multiple access communication resource, such as described in reference to FIGS. 4 and 6. For purposes of describing example aspects and operations thereof, a configuration will be assumed wherein such groups of as-described configuration transmission devices 820 can be arranged to include what will be referred to as a "first group of ACMA terminals 820" and a "second group first group of ACMA terminals 820" (visible in FIG. 8, but not specifically labelled as "first group" and "second group"). Implementation can include providing or configuring the system 800 with a controller logic (not separately visible in FIG. 8) configured to assign, for example, to the first group of ACMA terminals 820 and the second group of ACMA terminals 820 collectively, N+1 contiguous time slots from among a plurality of time slots of a frame of the synchronous orthogonal time/frequency multiple access communication resource.

Continuing with description of an example configuration of the system 800, the controller logic can be further configured to assign or cause to be assigned respective start times to each terminal of the first group of ACMA terminals 822 and to each terminal 822 of the second group of ACMA terminals 822. Also as described above, such configuration can include the respective start times being mutually different, and all start times occurring within a continuous interval having a start and an end, the start being within an $i^{th}$ of the contiguous time slots and the end being within the $(i+N-1)^{th}$ time slot. In an implementation, the controller logic can be configured to assign, or cause to be assigned to the first group of ACMA terminals 822 an $i^{th}$ time slot among the (N+1) time slots, and to assign, or cause to be assigned to the second group of ACMA terminals 822 another of the (N+1) time slots. For purposes of example, the other of the (n+1) time slots can be assumed as the $(i+1)^{th}$ time slot. In an implementation, the controller logic can be configured to communicate or cause to be communicated to each terminal 822 among the first group of ACMA terminals 822 the respective start times within the $i^{th}$ time slot, and to communicate or cause to be communicated to each terminal 822 among the second group of ACMA terminals 822 the respective start times within the $(i+1)^{th}$ time slot.

In an implementation, each VSAT 804 can include one or more receiver devices, as represented by items 822-1, 822-2, . . . 822-D (collectively "receiver device(s) 822"). Each receiver device 824 can be positioned with or otherwise associated with a corresponding one of the VSATs 804.

FIG. 8 is a functional block diagram of a computer system 800 upon which aspects of this disclosure may be implemented. Such aspects include, but are not limited to, particular logic blocks described in reference to FIG. 6. It will be understood that blocks visible in FIG. 8 represent functions, and do not necessarily correspond to particular hardware on a one-to-one basis.

The computer system 900 can include a data processor 902, instruction memory 904, and a general purpose memory 906, coupled by a bus 908. The instruction memory 906 can include a tangible medium storing computer-readable instructions that when executed by data processor 902 cause the processor to perform operations such as described in reference to FIGS. 3, 4, 5A, 5B, 6, and 7.

The computer system 900 can also include a communications interface 910, configured to interface with a local network 912 for accessing a local server 914, and to communicate through an Internet service provider (ISP) 916 to the Internet 918, and access a remote server 920. The computer system 900 can also include a display 922 and a user interface 924, such as a touchscreen or keypad.

Figure 10A:
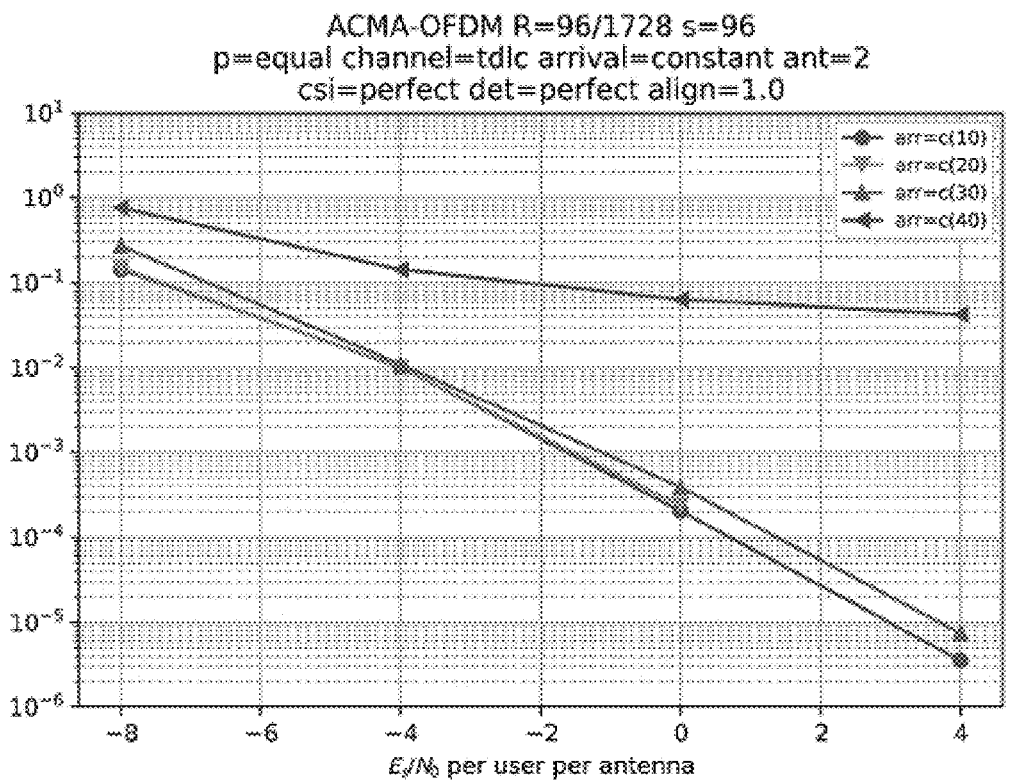
FIGS. 10A-10C, show simulation results of ACMA using ACMA in a multipath fading channel.
Figure 10B:
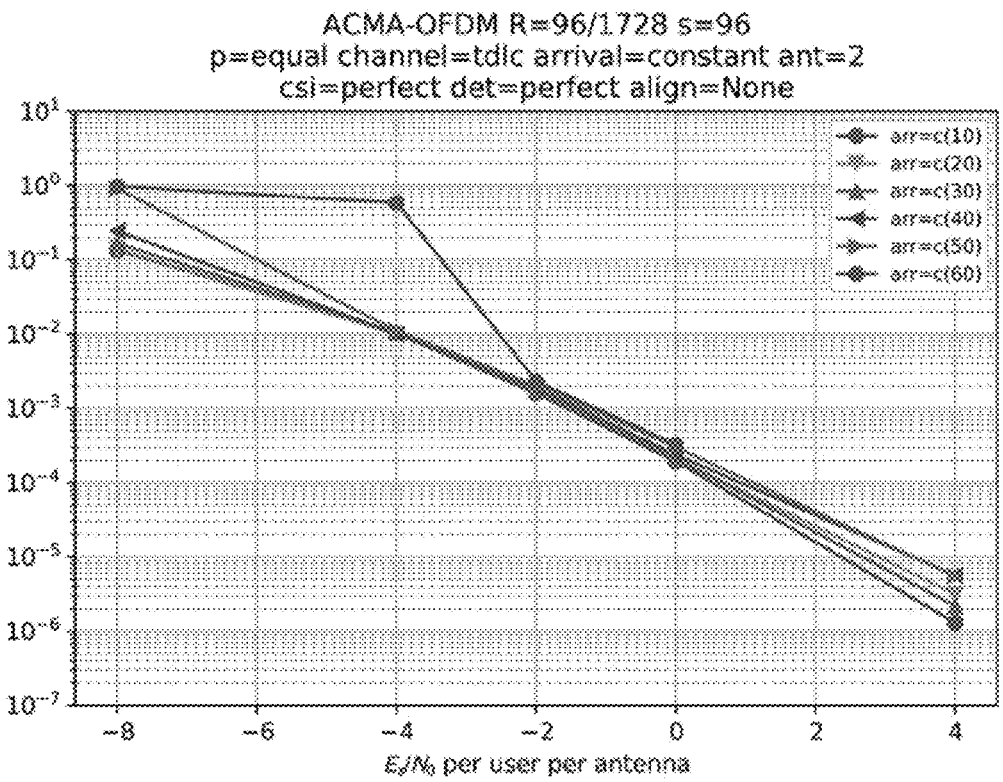
Figure 10C:
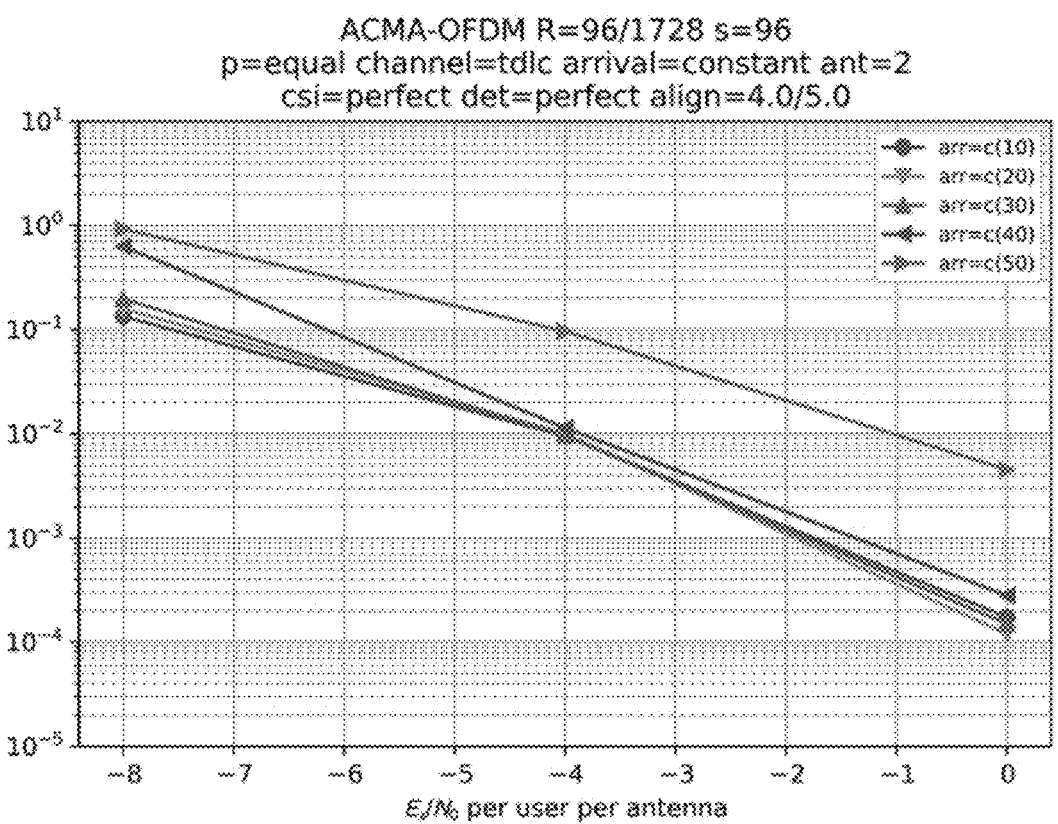

FIGS. 10A-10C show simulation results of ACMA with 10 bytes of information in using ACMA in TDL-C channel with 2 receive antennas using 1.08 MHz. FIG. 10A shows synchronous transmission in one subframe. FIG. 10B shows asynchronous transmission. FIG. 10C shows simulated results methods according to the present disclosure, with n=4. The simulated subframes are 1 msec subframes over a simulated wireless channel using two receive antennas. The specific transmission parameters follow those defined by 3GPP LTE and 5G, known as 6 Resource Blocks (RB). The wireless channel model is the so-called TDL-C with 300 nsec delay spread, also as defined by 3GPP. FIG. 10A shows a multiple access capacity for synchronous access being about 30 users. FIG. 10B shows this capacity is increased to 60 users per subframe with completely asynchronous transmission. Using the presently disclosed technique, the average capacity per subframe with n=4 is somewhat close to 50 users. Simulation results for ACMA to send 20 bytes also show similar behavior except the average number of users per subframe is reduced by about half.

The term "machine-readable medium (media)" as used herein refers to any medium that participates in providing data that causes a machine to operate in a specific fashion. Forms of machine-readable media can include, for example, a floppy disk, flexible disk, hard disk, magnetic tape, or any other magnetic medium, a compact disc (CD)-ROM or any other optical medium, punchcards, papertape, or any other physical medium with patterns of holes, a RAM, a PROM, and EPROM, a FLASH-EPROM, any other memory chip or cartridge or other medium from which a computer can read, and a carrier wave.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracing of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that terms and expressions used herein have the ordinary meaning accorded to such terms and expressions in their respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

In the foregoing Detailed Description, it can be seen that various features are grouped together in various examples for the purpose of streamlining the disclosure. This method of disclosure is not to be interpreted as reflecting an intention that any summary recitation requires more features than it expressly recites. The following claims form a portion of this disclosure.

What is claimed is:

1. A system, comprising: a processor; and a memory, coupled to the processor, that stores executable instructions that, when executed by the processor, cause the processor to:
   allocate a sequence of contiguous subframes within a time division multiplexing access (TDMA) scheme, the sequence of contiguous subframes being for asynchronous non-orthogonal multiple access (NOMA) transmissions, and extending from an allocation start time to an allocation termination time, the sequence of contiguous subframes being formed of contiguous time slots of the TDMA scheme; and
   provide to a plurality of asynchronous NOMA user terminals an indication of the allocation start time and the allocation termination time, indicating allowance to the asynchronous NOMA user terminals to perform asynchronous NOMA transmissions within a start time constraint and a termination time constraint, the start time constraint being that respective starts of the asynchronous NOMA transmissions do not precede the allocation start time, and the termination time constraint being that respective terminations of the asynchronous NOMA transmissions do not succeed the allocation termination time;
   wherein the plurality of asynchronous NOMA user terminals perform asynchronous NOMA transmissions in the sequence of contiguous subframes such that at least two of the asynchronous NOMA transmissions at least partially overlap in time.

2. The system of claim 1 wherein indicating allowance to the asynchronous NOMA user terminals includes allowance to the plurality of asynchronous NOMA user terminals to independently set the respective start times of the respective starts of the asynchronous NOMA transmissions, subject to the start time constraint and termination time constraint.

3. The system of claim 1, wherein:
   the contiguous time slots of the TDMA scheme have respective time slot durations, and
   allowance to the asynchronous NOMA user terminals to perform the plurality of asynchronous NOMA transmissions includes allowance for at least one of the asynchronous NOMA transmissions to extend for a duration that exceeds at least one of the respective time slot durations.

4. The system of claim 1, wherein:
   the TDMA scheme includes successive frames, and each of the successive frames includes K time slots,
   the contiguous time slots include N+1 contiguous time slots from among the K time slots, and
   the instructions further include instructions that, when executed by the processor, cause the processor to:
      grant transmission configurations to the plurality of asynchronous NOMA user terminals, for respective asynchronous NOMA transmissions, the transmission configurations including respective asynchronous NOMA transmission start times and an asynchronous NOMA transmission duration, wherein:
      each asynchronous NOMA transmission start time is within a first N of the N+1 contiguous time slots, and
      the asynchronous NOMA transmission duration is such that each asynchronous NOMA transmission terminates within the N+1 contiguous time slots.

5. The system of claim 4, wherein the transmission configurations to the respective asynchronous NOMA user terminals include:
   identification of a particular time slot among the first N of the N+1 contiguous time slots, and
   configuration for least two NOMA user terminals among the plurality of asynchronous NOMA user terminals to perform respective asynchronous NOMA transmissions that have respective asynchronous NOMA transmission start times within the particular time slot and, for a duration during the particular time slot, are in mutual overlap.

6. The system of claim 5, wherein:
   the particular time slot is a first time slot,
   the transmission configurations to the plurality of asynchronous NOMA user terminals include a configuration for another NOMA user terminal among the plurality of asynchronous NOMA user terminals to perform another asynchronous NOMA transmission, having another asynchronous NOMA transmission start time, the another asynchronous NOMA transmission start time being within a second time slot among the first N time slots, the second time slot being contiguous to the first time slot, and in accordance with the transmission configurations to the plurality of asynchronous NOMA user terminals, at least one among the asynchronous NOMA transmissions that during the particular time slot are in mutual overlap is, for a duration during the second time slot, in mutual overlap with the another asynchronous NOMA transmission.

7. The system of claim 5, wherein, in accordance with the transmission configurations to the plurality of asynchronous NOMA user terminals, at least one among the asynchronous NOMA transmissions that during the particular time slot are in mutual overlap, extends into another time slot among the first N time slots, the another time slot being contiguous to the particular time slot.

8. The system of claim 5 wherein, in accordance with the transmission configurations to the plurality of asynchronous NOMA user terminals, asynchronous NOMA user terminals among the plurality of asynchronous NOMA user terminals are allowed to independently set, within the particular time slot, the respective asynchronous NOMA transmission start times.

9. A method comprising:
allocating a sequence of contiguous subframes within a time division multiplexing access (TDMA) scheme, the sequence of contiguous subframes being for asynchronous non-orthogonal multiple access (NOMA) transmissions, and extending from an allocation start time to an allocation termination time;
providing to a plurality of asynchronous NOMA user terminals an indication of the allocation start time and the allocation termination time; and
providing to the asynchronous NOMA user terminals an allowance to perform asynchronous NOMA transmissions that are within a start time constraint and a termination time constraint, the start time constraint being that respective starts of the asynchronous NOMA transmissions do not precede the allocation start time, and the termination time constraint being that respective terminations of the asynchronous NOMA transmissions do not succeed the allocation termination time;
wherein the plurality of asynchronous NOMA user terminals perform asynchronous NOMA transmissions in the sequence of successive frames such that at least two of the asynchronous NOMA transmissions at least partially overlap in time.

10. The method of claim 9 wherein allowance to the asynchronous NOMA user terminals includes allowing the plurality of asynchronous NOMA user terminals to independently set the respective start times of the respective starts of the asynchronous NOMA transmissions, subject to the start time constraint and termination time constraint.

11. The method of claim 9, wherein:
the contiguous time slots of the TDMA scheme have respective time slot durations, and
allowance to the asynchronous NOMA user terminals to perform the plurality of asynchronous NOMA transmissions includes allowance for at least one of the asynchronous NOMA transmissions to extend for a duration that exceeds at least one of the respective time slot durations.

12. The method of claim 9, wherein:
the TDMA scheme includes successive frames, and each of the successive frames includes K time slots,
the contiguous time slots include N+1 contiguous time slots from among the K time slots, and
the method further comprises:
granting transmission configurations to the plurality of asynchronous NOMA user terminals, for respective asynchronous NOMA transmissions, the transmission configurations including respective asynchronous NOMA transmission start times and an asynchronous NOMA transmission duration, wherein:
each asynchronous NOMA transmission start time is within a first N of the N+1 contiguous time slots, and
the asynchronous NOMA transmission duration is such that each asynchronous NOMA transmission terminates within the N+1 contiguous time slots.

13. The method of claim 12, wherein the transmission configurations to the respective asynchronous NOMA user terminals include:
identification of a particular time slot among the first N of the N+1 contiguous time slots, and
configuration for least two NOMA user terminals among the plurality of asynchronous NOMA user terminals to perform respective asynchronous NOMA transmissions that have respective asynchronous NOMA transmission start times within the particular time slot and, for a duration during the particular time slot, are in mutual overlap.

14. The method of claim 13, wherein:
the particular time slot is a first time slot,
the transmission configurations to the plurality of asynchronous NOMA user terminals include a configuration for another NOMA user terminal among the plurality of asynchronous NOMA user terminals to perform another asynchronous NOMA transmission, having another asynchronous NOMA transmission start time, the another asynchronous NOMA transmission start time being within a second time slot among the first N time slots, the second time slot being contiguous to the first time slot, and
in accordance with the transmission configurations to the plurality of asynchronous NOMA user terminals, at least one among the asynchronous NOMA transmissions that during the particular time slot are in mutual overlap is, for a duration during the second time slot, in mutual overlap with the another asynchronous NOMA transmission.

15. The method of claim 13, wherein, in accordance with the transmission configurations to the plurality of asynchronous NOMA user terminals, at least one among the asynchronous NOMA transmissions that during the particular time slot are in mutual overlap extends into another time slot among the first N time slots, the another time slot being contiguous to the particular time slot.

16. The method of claim 13 wherein, in accordance with the transmission configurations to the plurality of asynchronous NOMA user terminals, asynchronous NOMA user terminals among the plurality of asynchronous NOMA user terminals are allowed to independently set, within the particular time slot, the respective asynchronous NOMA transmission start times.

17. A method comprising:
allocating a sequence of contiguous subframes within a time division multiplexing access (TDMA) scheme, the sequence of contiguous subframes being for asynchronous non-orthogonal multiple access (NOMA) transmissions, and extending from an allocation start time to an allocation termination time; and transmitting, by each among a plurality of asynchronous NOMA user terminals, respective asynchronous NOMA transmissions, the asynchronous NOMA transmissions having respective start times and respective termination times, the respective start times not preceding the allocation start time, and the respective termination times not succeeding the allocation termination time;

wherein the plurality of asynchronous NOMA user terminals perform asynchronous NOMA transmissions in the sequence of successive frames such that at least two of the asynchronous NOMA transmissions at least partially overlap in time.

18. The method of claim 17 wherein:

the TDMA scheme includes successive frames, and each of the successive frames includes K time slots, and the contiguous time slots include N+1 contiguous time slots from among the K time slots, the respective start times are within a first N of the N+1 contiguous time slots, and the respective termination times are within the N+1 contiguous time slots.

* * * * *